Jan. 26, 1937.  J. C. CURTIS  2,068,660
AIR FEED CONTROL FOR ROCK DRILLS
Filed Nov. 6, 1935
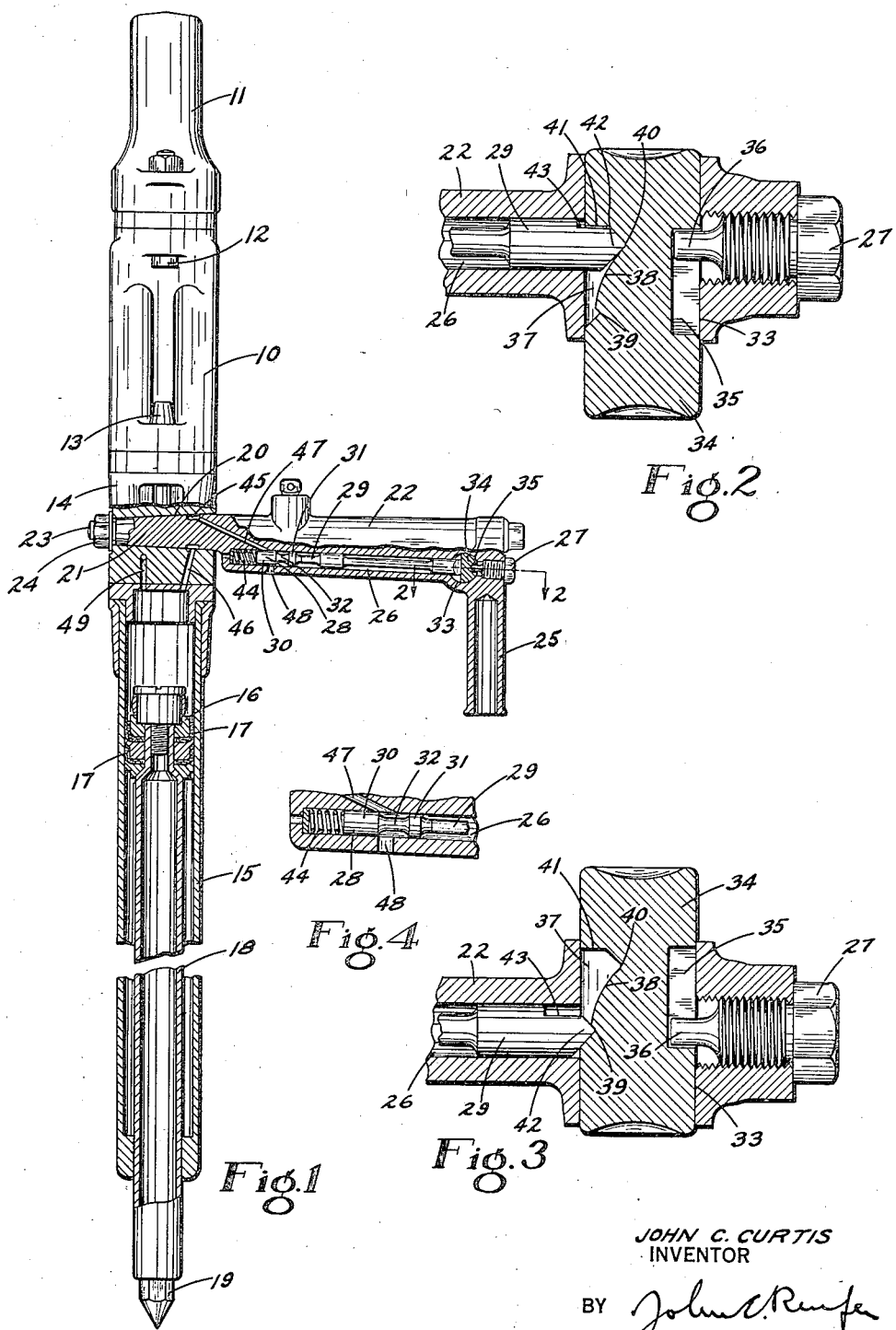
JOHN C. CURTIS
INVENTOR
BY *John C. Renfer*
ATTORNEY Patented Jan. 26, 1937

2,068,660

UNITED STATES PATENT OFFICE 2,068,660

AIR FEED CONTROL FOR ROCK DRILLS

John C. Curtis, Garfield Heights, Ohio, assignor to The Cleveland Rock Drill Company, Cleveland, Ohio, a corporation of Ohio Application November 6, 1935, Serial No. 48,471

11 Claims. (Cl. 121—9)

This invention relates broadly to fluid actuated rock drills of the hammer type, but more particularly to an air feed controlling device for hand rotated stope drills.

Heretofore manually rotated stope drills were equipped with an air feed controlling device including a valve or the like which had to be maintained in operative position by the operator exerting pressure thereon, thus preventing him or at least making it difficult for him to rotate the drill in the usual manner.

One object of this invention is therefore to provide a hand rotated stope drill with an air feed controlling device which may readily be shifted in operative or inoperative position by the operator while normally holding the tool, the device being equipped with locking means for holding the same in one or the other of the aforementioned positions without necessitating the attention of the operator.

Another object of this invention is to produce a hand rotated stope drill with an air feed controlling device which is simple of construction, strong, durable and efficient.

Other objects and advantages more or less ancillary to the foregoing reside in the specific construction and aggroupment of the elements peculiar to this structure, as will become apparent from a more complete examination of this specification.

In the drawing:

Fig. 1 is an elevational view partly in section illustrating a manually rotated stope drill embodying the invention.

Fig. 2 is an enlarged cross sectional view taken in a plane indicated by line 2—2 in Fig. 1.

Fig. 3 is a view similar to Fig. 2, illustrating some of the parts shown therein in different positions.

Fig. 4 is an enlarged view of a portion of the mechanism shown in Fig. 1.

Referring to the drawing in which like symbols designate corresponding parts throughout the several views, 10 represents the cylinder of a rock drill having a front housing 11 secured to one end thereof by bolts 12. To the other end of the cylinder 10 is secured by bolts 13 a head 14 and feed cylinder 15 located in coaxial alignment with the cylinder 10. Reciprocably mounted within the feed cylinder 15, there is a piston 16 carrying packings 17 in fluid tight engagement with the inner wall of the feed cylinder. To the piston 16 is rigidly secured a piston rod 18 extending therefrom through the free end of the feed cylinder, and terminated by a point 19 on which the machine rests.

Transversely disposed through the head 14, there is a tapered bore 20 adapted to receive the corresponding tapered shank 21 of a handle 22. This shank is terminated by a screw threaded portion 23 having a nut 24 screwed thereon in forcible engagement with the head 14 for maintaining the handle in a desired position. The handle 22 extends laterally from the tool and has depending from the free end thereof a handle grip 25, which is adapted to be grasped by the operator for holding and rotating the tool. Formed within the handle 22 in parallel alignment with the longitudinal center axis thereof, there is a flat bottom bore 26 having the extreme open end thereof threaded to receive a plug 27. Slidable within the bore 26, there is a valve 28 and a rod 29 mounted in abutting end engagement. The valve 28 is formed with two cylindrical lands 30 and 31 in fluid tight engagement with the inner wall of the bore 26. Between the lands 30 and 31 there is provided an annular groove 32, the purpose of which will be explained later.

Adjacent the upper end of the hand grip 25, the handle 22 is provided with another bore 33 traversing the bore 26, and opening on both sides of the handle. Slidable within the bore 33, there is a plunger 34 adapted to protrude from each side of the handle. This plunger is formed intermediate its end with a rectangular slot 35, which is adapted to receive the reduced end 36 of the plug 27. Diametrically opposed to the slot 35, the plunger 34 is provided with a cut away portion 37, the bottom of which is arcuated to form a cam 38 terminated by substantially V-shaped depressions 39 and 40, the latter being materially deeper than the former and united to the peripheral wall of the plunger by a straight end wall 41. The end of the rod 29 adjacent the plunger 34 is V-shaped as at 42, to fit in the depression 39 or 40, and is also provided with a flat 43 engageable with the straight end wall 41 of the cut away portion 37. Constantly urging the valve 28 in end engagement with the rod 29, and the latter in end engagement with the plunger 34, there is a compression spring 44 interposed between the valve 28 and the flat bottom of the bore 26.

Around the shank 21 of the handle 22, is provided an annular groove 45 leading into the upper end of the feed cylinder 15 through a port 46, and into the handle bore 26 through a port 47. Diametrically opposed to the opening of the port 47 in the bore 26, there is a port 48 leading from the bore 26 to the atmosphere. Detachably secured to the head 14, there is a motive fluid connection (not shown) from which motive fluid may be admitted into the feed cylinder 15 through a port 49.

In the operation of the device, let us assume that the stope drill is set for normal drilling operation with a drill steel extending from the front head 11, and that motive fluid is admitted into the air feed cylinder 15 through the port 49. The size of the air feed cylinder 15 is such that the motive fluid admitted therein and acting on the piston 16, will raise the machine until the drill steel engages the work. Thereafter motive fluid will be admitted into the working cylinder 10 to cause the reciprocation of the hammer piston therein, which is adapted to deliver blows to the drill steel. During the drilling operation, the operator holding the handle grip 25 is rotating the machine back and forth on its longitudinal center axis, imparting thereby rotation to the drill steel. When the plunger 34 is positioned as shown in Fig. 2, the end 42 of the rod 29 is maintained within the depression 40 of the plunger 34 due to the effort of the compression spring 44 engaging one end of the valve 28, and thereby maintaining the latter in the position shown in Fig. 1. In this position of the valve, it will be seen that the port 47 is closed by the land 30 of the valve 28, preventing thereby the escape of the motive fluid from the interior of the air feed cylinder 15. As previously stated, the lifting power of the feeding mechanism is calculated to maintain the drill steel in proper relation to the work when drilling rock of medium hardness. However when the drill steel encounters softer matter such as mud seam or the like, it is necessary to immediately reduce the power of the feeding mechanism to prevent the drill steel to bury itself in this softer formation. With the present construction, the operator while holding the hand grip 25 in the usual manner will apply his thumb to the plunger 34 and exert pressure thereon to shift the same in the position shown in Fig. 3. During the shifting of the plunger 34, the end 42 of the rod 29 riding the cam 38 will be moved toward the left in the drawing, until it drops into the depression 39, and thereby locks the plunger 34 against accidental movement while the latter is positioned as shown in Fig. 3. The movement of the rod 29 in a leftward direction, will cause the shifting of the valve 28 in the position shown in Fig. 4. In this instance, a portion of the motive fluid admitted into the feed cylinder 15 through the port 49 is free to exhaust therefrom via the port 46, annular groove 45, port 47, valve groove 32 and finally port 48. The amount of motive fluid thus escaping from the air feed cylinder is calculated to reduce the lifting power of the feeding mechanism in a manner causing the drill steel to be fed through relatively soft formation at a greatly reduced rate of speed, permitting thereby a free rotation of the machine. When it is desired to resume drilling operation under normal conditions, the operator will apply his first finger on the other end of the plunger 34 to exert a slight pressure thereon necessary to move the end 42 of the rod 29 out of the relatively shallow depression 39. Thereafter, the end 42 of the rod 29 riding the arcuated cam 38 will cause the plunger 34, due to the effort of the compression spring 44, to slide in the position shown in Fig. 2, thus causing the valve 28 to assume the position shown in Fig. 1, and preventing thereby the exhaust of the motive fluid through the port 47.

The slidable movement of the plunger 34 is primarily limited by the engagement of the V-shaped end 42 of the rod 29 within the V-shaped depressions 39 and 40 of the slot 37. However the accidental removal of the plunger 24 from the bore 33 as well as the rotation of the former relative to the latter, is prevented by the engagement of the reduced portion 36 of the plug 27 with the walls of the rectangular slot 35 within which it is located.

From the foregoing, it will be understood that with the present construction the lifting power of the feeding mechanism may be controlled at will without necessitating the operator to exert constant pressure on the plunger 34 to maintain the valve 28 in open position. It will further be understood that by virtue of the position of the plunger 34 relative to the handle grip 25, the former may readily be shifted in the desired position by the operator while normally holding the handle grip 25.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. In a rock drill, the combination with a drilling motor, of a fluid actuated feeding mechanism therefor, of a rotation handle rigidly secured to the rock drill, means for reducing the power of said feeding mechanism including an exhaust port leading therefrom to the atmosphere, a valve controlling said port movable into open or closed position relative thereto, an element within said handle capable of limited slidable movement transversally of said valve, means associated with said element and valve responsive to the slidable movement of the former for actuating the latter, and means associated with said element automatically operable at one end of the slidable movement thereof for locking the same in valve open position.

2. In a rock drill, the combination with a drilling motor, of a fluid actuated feeding mechanism therefor, of a rotation handle rigidly secured to the machine, means for reducing the power of said feeding mechanism including an exhaust port leading therefrom to the atmosphere, a valve controlling said port movable into open or closed position relative thereto, an element through said handle slidable therein upon manual pressure applied on either end thereof, means associated with said element and valve responsive to the slidable movement of the former for actuating the latter, and locking means associated with said element automatically operable for maintaining the latter in valve open position.

3. In a rock drill, the combination with a drilling motor, of a fluid actuated feeding mechanism therefor, of a rotation handle rigidly secured to the machine, an exhaust port leading from said feeding mechanism to the atmosphere, an exhaust port controlling valve movable into open or closed position, and means for actuating said valve including an element transversally of the latter slidable within said handle for moving said valve into open or closed position upon manual pressure alternatively applied on each end of said element.

4. In a rock drill, the combination with a drilling motor, of a feeding mechanism for said motor having motive fluid admitted therein for actuating the same, of a rotation handle rigidly secured to the rock drill and adapted to be held by the operator, means for reducing the power of said feeding mechanism by exhausting motive fluid therefrom including an exhaust port for said mechanism, exhaust port controlling means including a push button like element in said handle slidable into two positions upon manual pressure alternatively applied on each end thereof for opening or closing said exhaust port, and means associated with said element automatically operable for holding the same in either of the positions aforesaid against accidental slidable movement.

5. In a rock drill, the combination with a drilling motor, of a feeding mechanism for said motor having motive fluid admitted therein for actuating the same, of a rotation handle rigidly secured to the rock drill, means for reducing the power of said feeding mechanism by exhausting motive fluid therefrom including an exhaust port for said mechanism, exhaust port controlling means including a push button like element in said handle slidable into two positions for opening or closing said exhaust port, said element protruding from the handle to be actuated by manual pressure alternatively applied on each end thereof, locking means associated with said element automatically operable for holding the same in one position, said locking means arranged and disposed in a manner whereby the release thereof is effected upon manual pressure applied on said element for sliding the same in the other direction.

6. In a rock drill, the combination with a drilling motor, of a feeding mechanism for said motor having motive fluid admitted therein for actuating the same, of a rotation handle rigidly secured to the rock drill, means for reducing the power of said feeding mechanism by exhausting motive fluid therefrom including an exhaust port for said mechanism, exhaust port controlling means including a valve slidable in open or closed position relative to said exhaust port, an element slidable within said handle transversally of said valve and associated with the latter for actuating the same, and locking means associated with said element automatically operable for holding the same in a position causing said valve to remain open, said locking means arranged and disposed in a manner whereby the release thereof is effected upon pressure applied on said element for shifting the same in a position causing said valve to close said exhaust port.

7. In a rock drill, the combination with an element to be controlled, a handle, a passage leading from said element to the atmosphere, a valve for controlling said passage, a member slidable within said handle transversally of said valve and associated therewith for actuating the same, and means associated with said member for maintaining the same in a position causing said valve to remain opened with respect to said passage.

8. In a rock drill, the combination with an element to be controlled, a handle, a passage leading from said element to the atmosphere, a valve for controlling said passage, a spring associated with said valve normally maintaining the same in a closed position relative to said passage, a member slidable within said handle, contact means between said valve and member whereby the former is moved in open position relative to said passage upon slidable movement of said member in one direction, and means including said spring and contact means for maintaining said member in a position causing said valve to remain open with respect to said passage.

9. In a rock drill, the combination with a drilling motor, of a feeding mechanism for said motor having motive fluid admitted therein, of a rotation handle rigidly secured to the rock drill, an exhaust port for said mechanism through which motive fluid may be exhausted therefrom, a valve movable in open or closed position relative to said exhaust port, a member slidable within said handle associated with said valve for actuating the same, cam means on said member whereby the slidable movement of the latter in one direction causes said valve to move in open position relative to said exhaust port, and locking means associated with said member automatically operable for locking the same at the end of its travel in said one direction, thereby causing said valve to remain in open position relative to said port.

10. In a rock drill, a housing having a passage therein, and means for controlling said passage including a valve, a spring associated with said valve normally maintaining the same in a closed position relative to said passage, a member slidable within said housing, contact means between said valve and member whereby the former is moved into open position relative to said passage upon slidable movement of said member in one direction, and means including said spring and contact means for maintaining said member in a position causing said valve to remain open with respect to said passage.

11. In a rock drill, a housing having a passage therein, and means for controlling said passage including a valve movable into open or closed position relative to said passage, an element within said housing slidable transversally of said valve upon manual pressure applied on either end thereof, means associated with said element and valve responsive to the slidable movement of the former for actuating the latter, and locking means associated with said element automatically operable for maintaining the latter in valve open position.

JOHN C. CURTIS.